United States Patent [19]

Thompson

[11] Patent Number: 5,412,962
[45] Date of Patent: May 9, 1995

[54] SAFETY LOCKING DEVICES FOR PVC BALL VALVES

[76] Inventor: Robert A. Thompson, 54 Dumfries Dr., Dumfries, Va. 22026

[21] Appl. No.: 160,264

[22] Filed: Dec. 2, 1993

[51] Int. Cl.⁶ .............................................. F16K 35/00
[52] U.S. Cl. ...................................... 70/178; 70/232; 70/440; 109/20
[58] Field of Search ................... 70/158–169, 70/175–180, 209, 232, 237, 50, 416, 432, 439–441; 109/20, 25, 29; 137/247.21

[56] References Cited

U.S. PATENT DOCUMENTS

| 7,587 | 4/1877 | Hall | 70/178 |
|---|---|---|---|
| 674,582 | 5/1901 | Lewy | 70/178 |
| 725,290 | 4/1903 | Speer | 70/178 X |
| 994,409 | 6/1911 | Kelly | 70/178 |
| 3,112,636 | 12/1963 | McIntyre | 70/232 |
| 3,284,121 | 11/1966 | Lyon | 70/232 X |
| 3,572,063 | 3/1971 | Foote | 70/440 X |
| 4,300,373 | 11/1981 | Camos et al. | 70/178 X |
| 4,982,985 | 1/1991 | Atlas | 70/440 X |
| 5,208,085 | 5/1993 | Pace | 109/25 X |
| 5,293,990 | 3/1994 | Masakayan | 109/20 X |

FOREIGN PATENT DOCUMENTS

| 0473471 | 3/1992 | European Pat. Off. | 109/20 |
|---|---|---|---|
| 2576646 | 8/1986 | France | 70/432 |
| 516634 | 1/1931 | Germany | 70/178 |
| 8302975 | 9/1983 | WIPO | 109/25 |

Primary Examiner—Alexander Grosz
Assistant Examiner—Suzanne L. Dino

[57] ABSTRACT

A new and improved safety locking device for PVC ball valves and the like comprising, a housing positionable over a PVC ball valve of the type having a on/off handle rotatable about a vertical axis, the handle including a horizontal section positionable in the direction of flow of fluid within coupled pipes when in an open orientation and positionable perpendicular to the direction of flow when in a closed orientation; the housing being formed of a pair of similarly shaped mating halves, each half having a front face and a rear face with each face having a semicircular opening which, when the housing halves are coupled for operation and use, define a circular opening with a central axis coextensive with the axis of the ball valve and pipes coupled with respect thereto, each housing half also having a top face and a bottom face and an exterior side face coupling the front and rear faces but leaving open the interior face with the semicircular openings; the front and rear faces of the housing halves being sufficient in size to form a chamber for a ball valve; a hinge pivotally coupling the housing halves; a supplemental plate with an aperture on each housing half, the apertures of the plates being aligned for the receipt of a lock; a rectangular cut out formed in at least one of the front and rear faces of each housing half as an extension of the circular openings, the cut out being positioned and sized to receive the handle of the ball valve when in the open orientation but to preclude movement of the handle from one orientation to the other when the housing halves are coupled and locked.

3 Claims, 3 Drawing Sheets

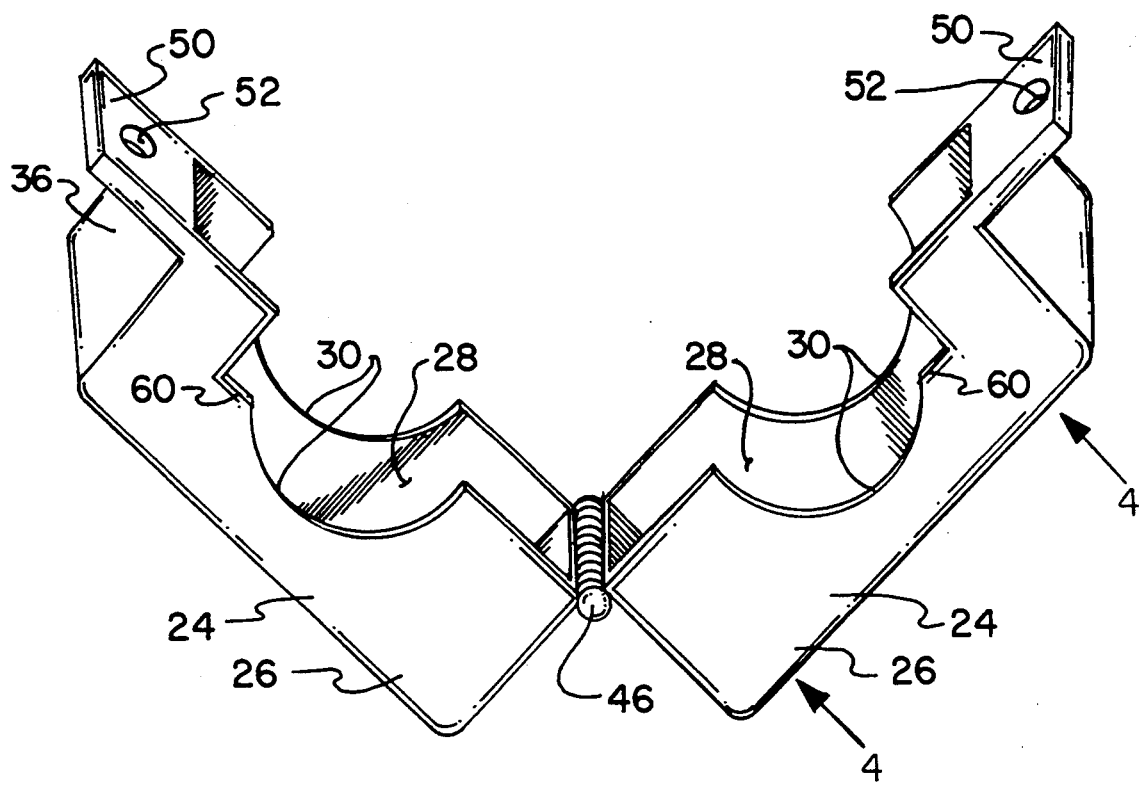
F I G. 3
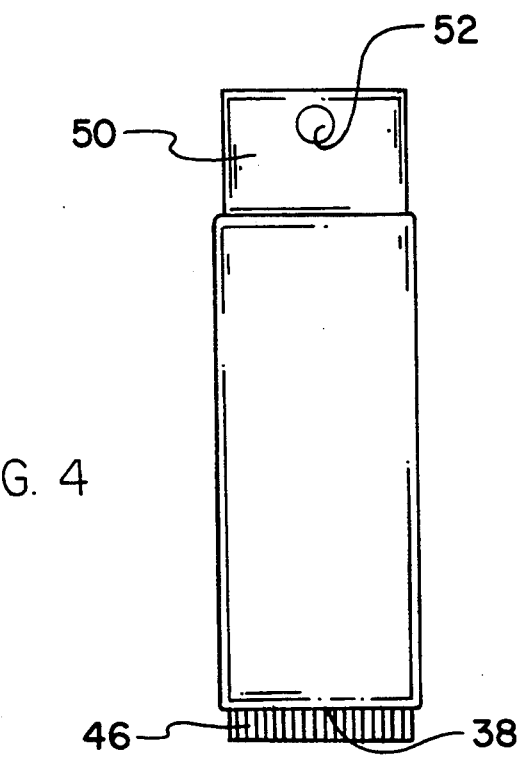
F I G. 4

SAFETY LOCKING DEVICES FOR PVC BALL VALVES

BACKGROUND OF THE INVENTION

1. Field of the Invention

The present invention relates to safety locking device for PVC ball valves and more particularly pertains to a locking device to maintain a PVC ball valve in a preset orientation.

2. Description of the Prior Art

The use of valve locking devices are known in the prior art. More specifically, valve locking devices heretofore devised and utilized for the purpose of maintaining valves in a preset orientation are known to consist basically of familiar, expected and obvious structural configurations, notwithstanding the myriad of designs encompassed by the crowded prior art which have been developed for the fulfillment of countless objectives and requirements.

The prior art shows various locking devices for ball valves. Note, for example, U.S. Pat. No. 4,630,456 to Neilsen which shows a casket lock for a valve assembly.

U.S. Pat. No. 4,538,434 to Janzen discloses a security housing for oil storage tank valves.

U.S. Pat. No. 4,843,846 to Wagner discloses a locking device for a valve.

In this respect, the safety locking devices for PVC ball valves according to the present invention substantially depart from the conventional concepts and designs of the prior art, and in so doing provides an apparatus primarily developed for the purpose of maintaining a valve in a preset orientation.

Therefore, it can be appreciated that there exists a continuing need for new and improved safety locking device for PVC ball valves which can be to maintain the valve in its preset orientation. In this regard, the present invention substantially fulfills this need.

SUMMARY OF THE INVENTION

In view of the foregoing disadvantages inherent in the known types of ball valve locking devices now present in the prior art, the present invention provides improved safety locking devices for PVC ball valves. As such, the general purpose of the present invention, which will be described subsequently in greater detail, is to provide a new and improved safety locking device for PVC ball valves apparatus and method which has all the advantages of the prior art and none of the disadvantages.

To attain this, the present invention essentially comprises a new and improved safety locking device for PVC ball valves comprising, in combination a housing positionable over a PVC ball valve of the type having a on/off handle rotatable about a vertical axis, the handle including a horizontal section positionable in the direction of flow of fluid within coupled pipes when in an open orientation and positionable perpendicular to the direction of flow when in a closed orientation; the housing being formed of a pair of similarly shaped mating halves, each half having a front face and a rear face with each face having a semicircular opening which, when the housing halves are coupled for operation and use, define a circular opening with a central axis coextensive with the axis of the ball valve and pipes coupled with respect thereto, each housing half also having a top face and a bottom face and an exterior side face coupling the front and rear faces but leaving open the interior face with the semicircular openings; the front and rear faces of the housing halves being sufficient in size to form a chamber for a ball valve; a hinge pivotally coupling the housing halves at their adjacent interior edges of their bottom faces; an upwardly extending plate with an aperture on each housing half at the adjacent interior edges of their top faces, the apertures of the plates being aligned for the receipt of a lock; a rectangular cut out formed in the front and rear faces of each housing half extending upwardly as an extension of the circular openings, the cut out being positioned and sized to receive the handle of the ball valve when in the open orientation but to preclude movement of the handle from one orientation to the other when the housing halves are coupled and locked; and supplemental aligned apertures in the upwardly extending plates one further including a tamper indicator within such apertures, such tamper indicator including a rupturable container of elastomeric material having adhesive on the exterior for coupling to the aperture and a dye on the interior for being dispensed in the event of tampering.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved safety locking devices for PVC ball valves which have all the advantages of the prior art valve locking devices and none of the disadvantages.

It is another object of the present invention to provide new and improved safety locking devices for PVC ball valves which may be easily and efficiently manufactured and marketed.

It is a further object of the present invention to provide new and improved safety locking devices for PVC ball valves which are of a durable and reliable construction.

An even further object of the present invention is to provide new and improved safety locking devices for PVC ball valves which are susceptible of a low cost of manufacture with regard to both materials and labor, and which accordingly are then susceptible of low prices of sale to the consuming public, thereby making such safety locking device for PVC ball valves economically available to the buying public.

Still yet another object of the present invention is to provide new and improved safety locking devices for PVC ball valves which provide in the apparatuses and methods of the prior art some of the advantages thereof, while simultaneously overcoming some of the disadvantages normally associated therewith.

Still another object of the present invention is to maintain a PVC ball valve in a preset orientation.

Yet another object of the present invention is to indicate when someone has tampered with a preset PVC ball valve has been tampered with.

Even still another object of the present invention is to provide a new and improved safety locking device for PVC ball valves comprising a housing positionable over a PVC ball valve of the type having a on/off handle rotatable about a vertical axis, the handle including a horizontal section positionable in the direction of flow of fluid within coupled pipes when in an open orientation and positionable perpendicular to the direction of flow when in a closed orientation; the housing being formed of a pair of similarly shaped mating halves, each half having a front face and a rear face with each face having a semi-circular opening which, when the housing halves are coupled for operation and use, define a circular opening with a central axis coextensive with the axis of the ball valve and pipes coupled with respect thereto, each housing half also having a top face and a bottom face and an exterior side face coupling the front and rear faces but leaving open the interior face with the semicircular openings; the front and rear faces of the housing halves being sufficient in size to form a chamber for a ball valve; a hinge pivotally coupling the housing halves; a supplemental plate with an aperture on each housing half the apertures of the plates being aligned for the receipt of a lock; a rectangular cut out formed in at least one of the front and rear faces of each housing half as an extension of the circular openings, the cut out being positioned and sized to receive the handle of the ball valve when in the open orientation but to preclude movement of the handle from one orientation to the other when the housing halves are coupled and locked.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective illustration of the device of the prior figures but shown in the open orientation for the receipt of a valve.

FIG. 4 is a side elevational view of one of the halves of the apparatus of the prior Figures.

DESCRIPTION OF THE PREFERRED EMBODIMENT

Figure 1:
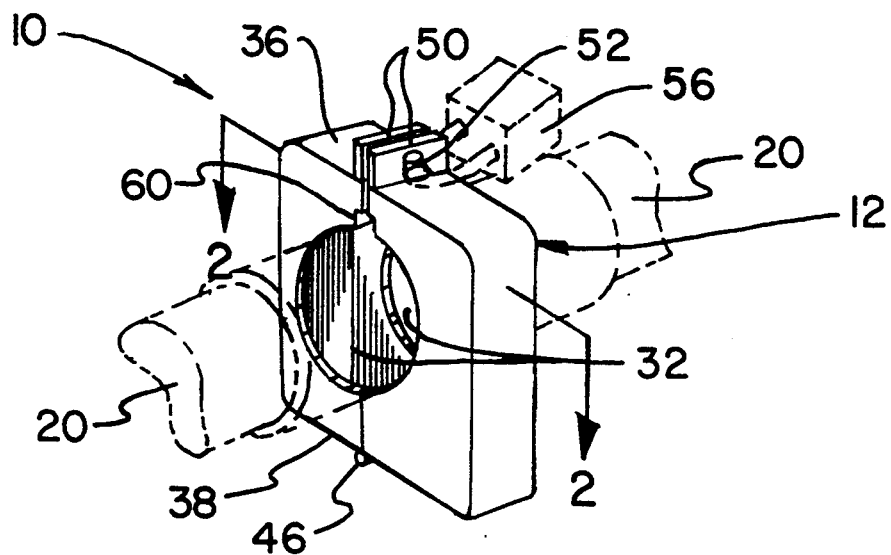
FIG. 1 is a perspective illustration of a safety locking device for PVC ball valves constructed in accordance with the primary embodiment of the invention.
Figure 2:
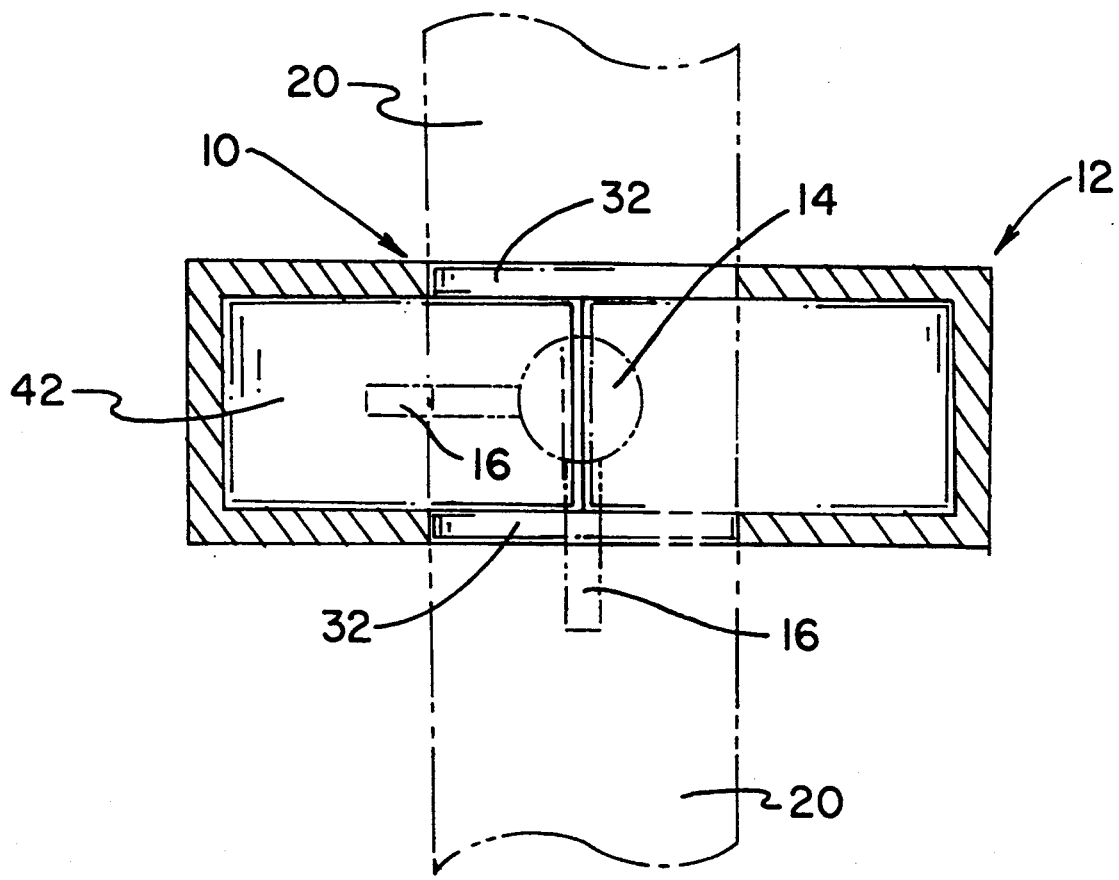
FIG. 2 is a sectional view taken along line 2—2 of FIG. 1.

With reference now to the drawings, and in particular to FIG. 1 thereof, a new and improved safety locking device for PVC ball valves embodying the principles and concepts of the present invention and generally designated by the reference numeral 10 will be described.

The primary embodiment of the invention is shown in FIGS. 1 through 4 and includes a system 10 for safely locking a PVC ball valve and the like in a preset orientation. Such system includes various components. The primary component is the housing 12.

The housing 12 is adapted to be positionable over a PVC ball valve 14. Such valve is of the type having a on/off handle 16 rotatable about a vertical axis. The handle includes a horizontal section positionable in the direction of flow of fluid within coupled pipes 20 when in an open orientation. The handle is positionable perpendicular to the direction of flow of fluid with coupled pipes when in a closed orientation. Note the showings of FIG. 2 which illustrates the alternate positions of the handle 16.

The housing 12 is formed of a pair similarly shaped mating halves. Each half 24 has a front face 26 and a rear face 28 with each face having a semi-circular opening 30. When the housing halves 20 are coupled for operation and use, the openings define a circular opening 32 with a central axis coextensive with the axis of the ball valve and pipes 20 coupled with respect thereto. Each housing half also has a top face 36 and a bottom face 38 and an exterior side face 40 coupling the front and rear faces but leaving open the interior face with the semicircular openings.

The front and rear faces of the housing halves are sufficient in size to form a chamber 42. The chamber is for receiving a ball valve 14.

A hinge 46 pivotally couples the housing halves at their adjacent interior edges of their bottom faces.

Also provided as part of the system 10 is an upwardly extending plate 50 on each housing half. Such plates are formed with apertures 52. The plates are coupled to the housing halves at the adjacent to the interior edges of the top faces. The apertures 52 of the plates 50 are aligned for the receipt of a lock 56 which functions to maintain the housing halves together and the handle 16 of the valve 14 in its preset orientation.

A rectangular cut out 60 is formed in the front and rear faces of each housing half. Such cut outs are in mutual alignment and extend upwardly as an extension of the circular openings. The cut outs are positioned and sized to receive the handle 16 of the ball valve when in the open orientation. The cut outs 60, however, are sized and shaped to preclude movement of the handle from one orientation to the other when the housing halves are coupled and locked. Consider FIG. 2.

Figure 5:
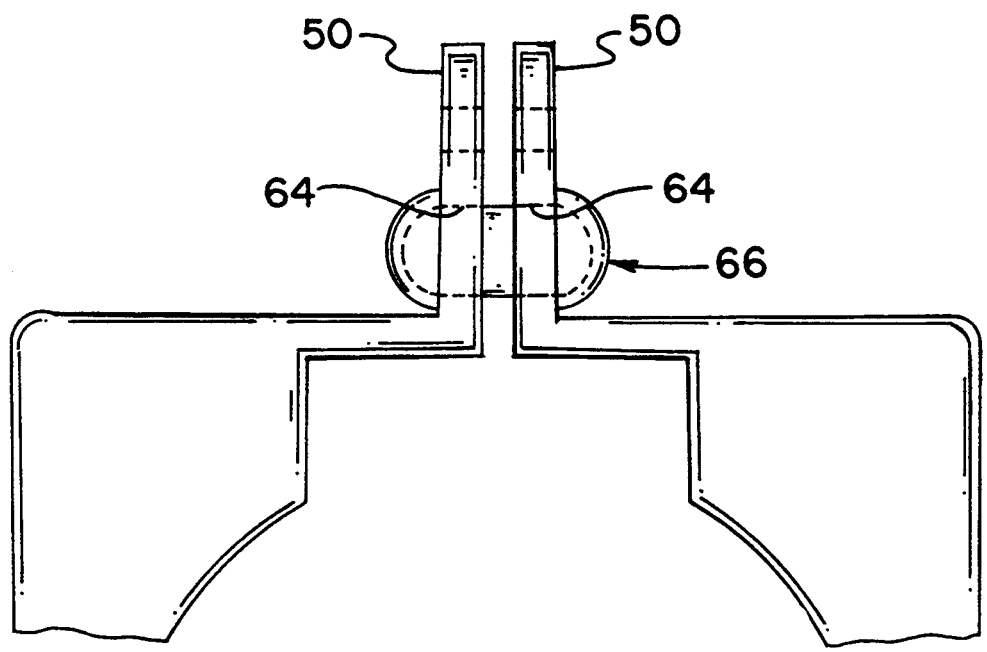
FIG. 5 is an enlarged elevational view of the upper extent of a device similar to that of the prior Figures but constructed in accordance with the principles of the present invention.
Figure 6:
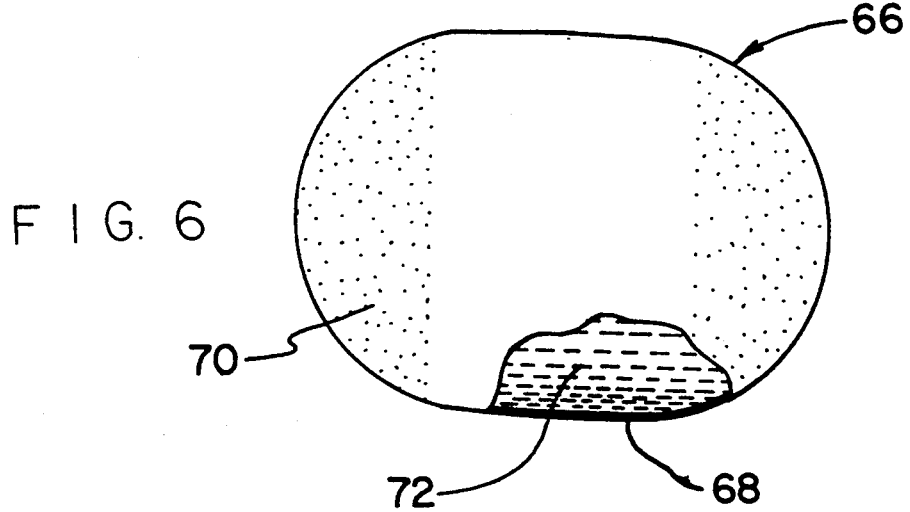
FIG. 6 is an elevational view of the tamper indicator of FIG. 5 with parts broken away to show certain internal constructions thereof.

An alternate embodiment of the invention is shown in FIGS. 5 and 6. In such alternate embodiment, the upwardly extending plates 50 also include supplemental aligned apertures 64. Further included is a tampered indicator 66. Such indicator is located within the apertures 64. The tamper indicator includes a rupturable container 68 of elastomeric material having adhesive 70 on its exterior surface for coupling to the aperture 64. A dye 72 is located on the interior of the indicator for being dispensed in the event of tampering.

Although not shown the wire of an OSHA tag may be fed through either hole 52 or 64 of the plate 50 as might be legally required.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved safety locking device for PVC ball valves and the like comprising, in combination:

a housing positionable over a PVC ball valve of the type having a on/off handle rotatable about a vertical axis, the handle including a horizontal section positionable in the direction of flow of fluid within coupled pipes when in an open orientation and positionable perpendicular to the direction of flow when in a closed orientation;

the housing being formed of a pair of similarly shaped mating halves, each half having a front face and a rear face with each face having a semi-circular opening which, when the housing halves are coupled for operation and use, define a circular opening with a central axis coextensive with the axis of the ball valve and pipes coupled with respect thereto, each housing half also having a top face and a bottom face and an exterior side face coupling the front and rear faces but leaving open the interior face with the semicircular openings;

the front and rear faces of the housing halves being sufficient in size to form a chamber for a ball valve;

a hinge pivotally coupling the housing halves at their adjacent interior edges of their bottom faces;

an upwardly extending plate with an aperture on each housing half at the adjacent interior edges of their top faces, the apertures of the plates being aligned for the receipt of a lock;

a rectangular cut out formed in the front and rear faces of each housing half opposite the hinge extending upwardly as an extension of the circular openings, the cut out being positioned and sized to receive the handle of the ball valve when in the open orientation but to preclude movement of the handle from one orientation to the other when the housing halves are coupled and locked; and supplemental aligned apertures in the upwardly extending plates one further including a tamper indicator within such apertures, such tamper indicator including a rupturable container of elastomeric material having adhesive on the exterior for coupling to the aperture and a dye on the interior for being dispensed in the event of tampering.

2. A new and improved safety locking device for PVC ball valves and the like comprising:

a housing positionable over a PVC ball valve of the type having a on/off handle rotatable about a vertical axis, the handle including a horizontal section positionable in the direction of flow of fluid within coupled pipes when in an open orientation and positionable perpendicular to the direction of flow when in a closed orientation;

the housing being formed of a pair of similarly shaped mating halves, each half having a front face and a rear face with each face having a semi-circular opening which, when the housing halves are coupled for operation and use, define a circular opening with a central axis coextensive with the axis of the ball valve and pipes coupled with respect thereto, each housing half also having a top face and a bottom face and an exterior side face coupling the front and rear faces but leaving open the interior face with the semicircular openings;

the front and rear faces of the housing halves being sufficient in size to form a chamber for a ball valve;

a hinge pivotally coupling the housing halves;

a supplemental plate with an aperture on each housing half, the apertures of the plates being aligned for the receipt of a lock;

a rectangular cut out formed in at least one of the front and rear faces of each housing half opposite the hinge as an extension of the circular openings, the cut out being positioned and sized to receive the handle of the ball valve when in the open orientation but to preclude movement of the handle from one orientation to the other when the housing halves are coupled and locked.

3. The apparatus as set forth in claim 2 wherein the supplemental plates include aligned apertures and further including a tamper indicator within such apertures, such tamper indicator including a rupturable container of elastomeric material having adhesive on the exterior for coupling to the aperture and a dye on the interior for being dispensed in the event of tampering.

* * * * *